May 3, 1966 W. H. BUCHSBAUM 3,249,742

DIGITAL INPUT-OUTPUT DISPLAY

Filed Aug. 13, 1962 2 Sheets-Sheet 1

May 3, 1966 W. H. BUCHSBAUM 3,249,742

DIGITAL INPUT-OUTPUT DISPLAY

Filed Aug. 13, 1962 2 Sheets-Sheet 2

United States Patent Office 3,249,742

Patented May 3, 1966

3,249,742

DIGITAL INPUT-OUTPUT DISPLAY

Walter H. Buchsbaum, 108—42 68th Ave., Forest Hills 75, N.Y.

Filed Aug. 13, 1962, Ser. No. 216,359
4 Claims. (Cl. 235—92)

This invention relates generally to the field of electronic computers, and more particularly to an improved device for inserting information into a computer, and for receiving computed information and transferring the same to a readable form.

In many computers and data-processing machines, it is desired to enter certain data into the machine, have the machine operate on that data and indicate a new set of data to the human operator. Typical is the case of a digital airborne navigation computer. In such devices, the operator enters the starting longitude and latitude, and aircraft speed and course are then supplied to the computer directly from cockpit instruments. Since the original position coordinates are no longer of interest, the computer need only show the most recently computed position. After a period of operation, the operator may obtain an accurate radio fix or from visually observing a beacon or landmark, and may then want to make a correction in the computed position. As the flight continues, the computer constantly updates the position, and the operator may check it against radio fixes or landmarks and make appropriate corrections. In existing computers, initial position data are usually cranked in through a set of gears, counters and potentiometers. The computed data are indicated either on dials, or, at best, on some numerical read-out means such as Nixie indicator tubes.

To correct position data, the operator must first re-set the computer and then proceed as if a new start had been made. As a part of the operation, the computer unit must also convert the human arithmetic, normally decimal, to computer language, which is usually binary, and upon completion of computation, the same must be converted back into decimal. In addition, the computer must remember the most recent position in order to be able to update it with speed and heading data. It must also store the newly computed position data long enough so that it is visible on the read-out. In the case of Nixie indicator tubes, an intermediate storage must be supplied to keep the tubes illuminated.

It is among the principal objects of the present invention to provide a digital input-output display device capable of combining the function of input and output indication, and to provide both code conversion and memory for the computer.

Another object of the invention lies in the provision of a device of the class described which may be readily used in conjunction with many existing types of digital computers, without extensive alteration of the latter.

A further object of the invention lies in the provision of mechanical means which may be used in conjunction with digital or other machine code computers, capable of converting decimal information into machine code and back again to decimal, and which may be capable of retaining its last reading until superseded by subsequent readings.

Still another object of the invention lies in the provision of a device of the class described, and possessed of the above advantages, in which the cost of fabrication may be of a reasonably low order, with consequent wide sale, distribution and use.

A feature of the invention lies in the fact that any number of the disclosed devices may be stacked next to each other with minimum spacing, thereby materially increasing the utility of the device.

Another feature of the invention lies in the fact that the component parts thereof are relatively small in number, thereby facilitating whatever servicing may be necessary during the useful life of the device.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

Figure 1:
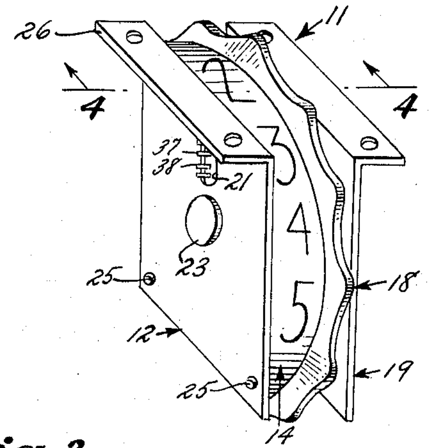
FIGURE 1 is a view in perspective of an embodiment of the invention.
Figure 2:
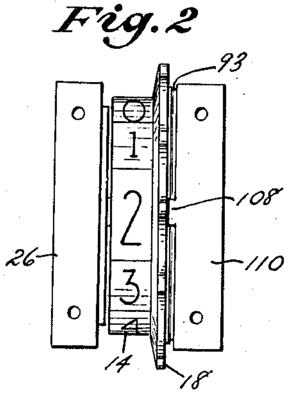
FIGURE 2 is a plan view of the embodiment.

In accordance with the invention, the device, generally indicated by reference character 11, comprises broadly: a first end bracket element 12, a contact plate element 13, a display drum 14, a display drum magnet 15, a coil assembly 16, a decimal commutator 17, manual drum-moving means 18, and a second end bracket element 19.

The first end bracket element 12 may be formed as a metallic stamping from planar sheet material, and includes a vertically disposed main body member 20 having an elongated slot 21 therein beneath which is disposed a centrally located opening 22 which engages a bearing member 23. A plurality of smaller openings 24 are penetrated by rivets 25 which serve as means to interconnect the bracket element 12 with the contact plate element 13. Extending laterally from the upper edge of the member 20 is an angularly disposed mounting member 26.

The contact plate element 13 is of generally rectangular configuration corresponding to that of the element 12, and is bounded by an outer surface 30 which normally lies in juxtaposed relation with respect to the inner surface 31 of the element 12. A central opening 32 corresponds to the opening 22, while the smaller openings 33 correspond to the openings 24 therein. Aligned with the elongated slot 21 are a plurality of solder lugs 34, 35, 36, 37, 39 and 40. Formed integrally with the lugs 34–40 are a plurality of wiping contacts 41, 42, 43, 44, 45 and 46, respectively, which overlie the inner surface 47 of the plate element 13. A small washer 48 overlies the opening 32, and is penetrated by the bearing member 23.

Figure 6:
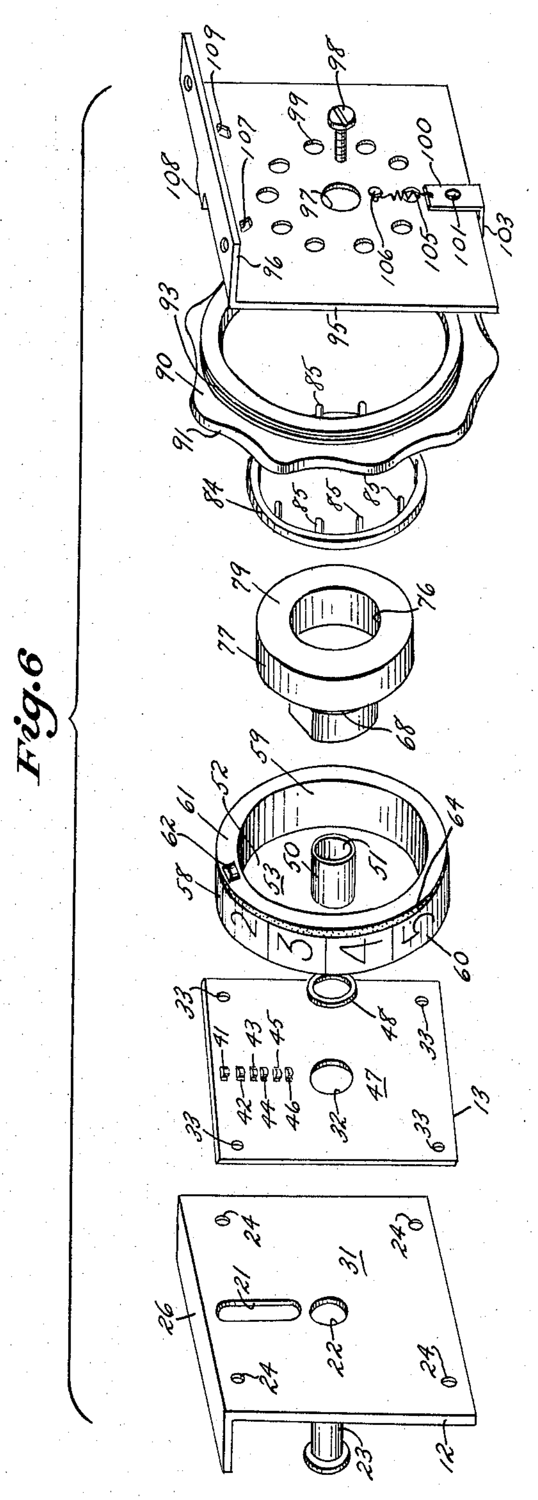
FIGURE 6 is an exploded view in perspective of the embodiment.

The display drum 14 may be formed as a machined casting, or may be injection molded from synthetic resinous materials using well-known techniques. It includes an axially disposed bearing member 50 which, in assembled condition, surrounds the bearing member 23 which is disposed in a bore 51 thereof. Formed integrally with the member 50 is a radially arranged member 52, having an inner surface 53 and an outer surface 54 having a machine code circuit 55 for converting a digital code to a binary or other machine code. The circuit 55 is preferably formed by using well-known printed circuit techniques. As best seen in FIGURE 6, the circuit 55 includes a plurality of segments 56, in the disclosed embodiment, there being four rings of such segments corresponding to the digital code which will normally be used for inserting information. A peripheral contact ring 57 is provided with a conducting rivet 57*a*. Formed integrally with the member 52 is a cylindrical member 58 having an inner surface 59 and an outer surface 60, as well as an end surface 61 from which extends a decimal wiping contact 62 connected to the above-mentioned rivet 57*a*. Adjacent the end surface 61 is a friction clutch surface 64 selectively contacted by the means 18.

The magnet 15 is of generally hollow cylindrical configuration, having a bore 66 engageable upon the outer surface of the bearing member 50, a pair of end surfaces 67 and 68, a pair of planar surfaces 69 and 70, and a pair of arcuate surfaces 71 and 72. Owing to its configuration, which is other than completely cylindrical, the magnet will be responsive to directionally oriented lines of magnetic flux, which response will serve to position the display drum 14.

Figure 7:
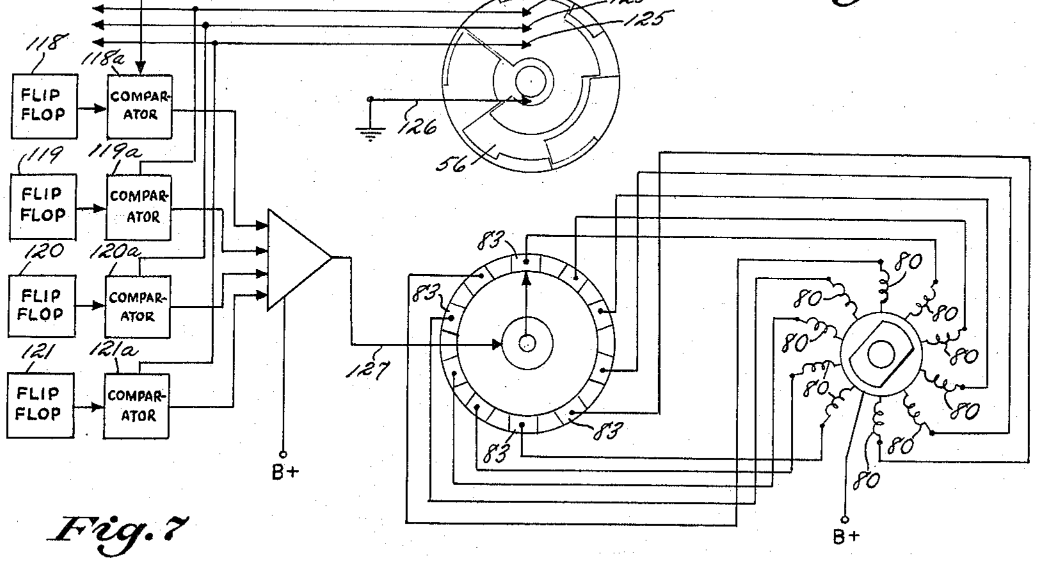
FIGURE 7 is an electric schematic wiring diagram, showing the interconnection of the embodiment with computer circuits.
Figure 5:
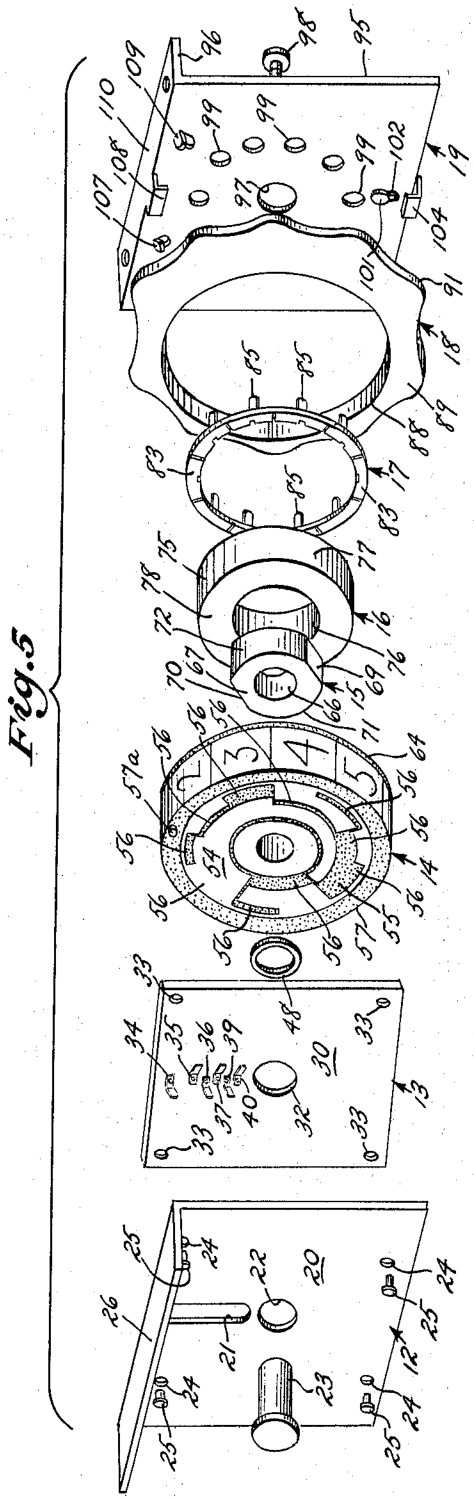
FIGURE 5 is an exploded view in perspective of the embodiment showing the sides opposite that disclosed in FIGURE 6.

The coil assembly 16 is illustrated in FIGURES 5 and 6 as including a casing 75 of generally annular configuration, having inner and outer cylindrical walls 76 and 77, respectively, as well as end walls 78 and 79. Referring to FIGURE 7, where they are schematically illustrated, ten coils, generally indicated by reference character 80, are radially disposed within the casing 75, and selectively provide directionally oriented lines of flux in the proximity of the magnet 15. In assembled condition, the casing 75 surrounds the magnet and is coaxially disposed therewith.

The decimal commutator 17 includes ten conductive segments 83 mounted upon an insulative member 84, there being solder lug connections 85 leading from the segments 83 to be connected to the coils 80, as illustrated in FIGURE 7.

The manual drum-moving means 18 serves to permit the display drum 14 to be selectively positioned for the input of digital information by the operator of the device, and in disengaged position permits the drum to be rotated in response to information received from the computer circuit. In essence, the means 18 comprises a manually engageable clutch, preferably formed as a casting, and including a bore 88 which selectively engages the surface 64, side surfaces 89 and 90, and a knurled or scalloped peripheral surface 91. Extending from the side surface 90 is a projecting annular flange having a retaining groove 93 therein.

The second end bracket element 19 is generally similar to the first end bracket element 12, including a vertically disposed member 95, and an angularly disposed mounting bracket 96. The centrally disposed opening 97 accommodates a screw 98 engaging the bearing 23. A plurality of openings 99 are arranged in circular fashion to accommodate the lugs 85. To keep the manual drum-moving means disengaged from the display drum, there is provided a slider 100 arranged for vertical movement on a stud 101, which engages a slot 102 in the slider 100. The slider 100 includes a longitudinally extending tab 103 having a retaining portion 104 engaging the groove 93 as the same rotates. A slider spring 105 is secured at one end thereof to the slider 100, and at a second end thereof to a fixed stud 106. To prevent axial movement (other than rotation) of the means 18, there are provided three retaining means 107, 108 and 109. The angularly disposed mounting member 110 corresponds directly to the member 26.

If it is desired to prevent the computer from rotating the display drum at the time manual data are inserted, a micro-switch (not shown) need only be added below the slider 100 so that when means 18 is depressed and slider 100 is therefore lowered, the microswitch is actuated and can prevent the computer from entering data.

Figure 3:
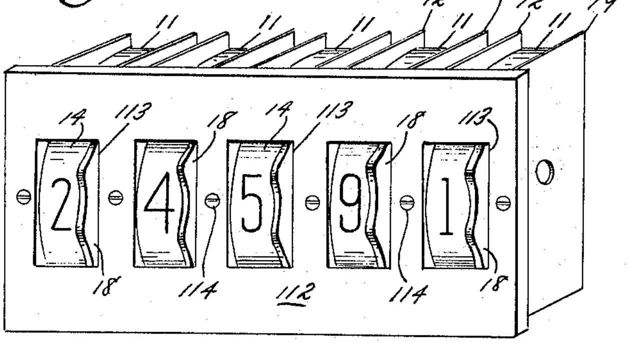
FIGURE 3 is a view in perspective showing a plurality of devices in assembled condition within a panel, which panel may be mounted upon a conventional machine code computer.
Figure 4:
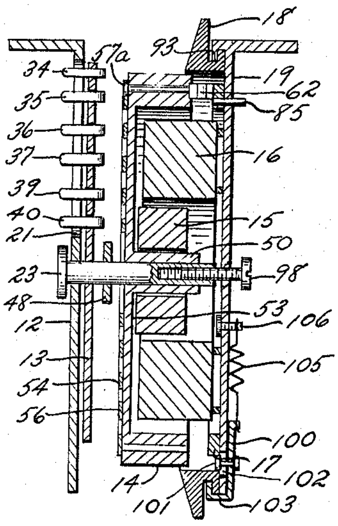
FIGURE 4 is a longitudinal central sectional view of the embodiment.

Referring to FIGURE 3 in the drawings, a plurality of devices 11 may be mounted in stacked relation beneath a face plate 112, the face plate 112 having openings 113 through which the means 18 projects and the display drum 14 is visible. When such mounting is made, the members 26 and 110 may be vertically disposed rather than horizontally disposed as illustrated in the remaining figures. Screw means 114 will penetrate the face plate 112 and engage the bracket elements 12 and 19.

Referring to FIGURE 7, there is illustrated a typical binary-to-decimal conversion scheme. It will be understood by those skilled in the art to which the present invention pertains that practically any other set of codes may be employed following the same principles. The present embodiment has been illustrated since binary arithmetic is the language of most digital computers, and decimal numbers the arithmetic of the human observer.

In FIGURE 7 the boxes marked "flip-flop" are taken to mean a bi-stable circuit commonly referred to as flip-flop, but this circuit may utilize relays, vacuum tubes, transistors, ferromagnetic or other electronic devices. The boxes marked "comparator" similarly can use a variety of electronic devices but shall perform in such a manner that two input signals of equal polarity shall result in a positive output while unequal polarities shall result in a ground output. The triangular symbol in FIGURE 7 represents an AND circuit, commonly used in digital computers. Regardless of the type of components used, the AND circuit will produce a positive output only if all four input signals are positive. If one or more input signals are grounded the AND circuit will always produce a ground output.

Assume that a binary "one" is indicated by a ground and a binary "zero" by the absence of a ground. Next assume that the display drum indicates the numeral 3 and that the computer wants to display the numeral 5. The computer will set flip-flop 118, as the least significant bit, to "one," making the output to comparator 118*a* a ground. Flip-flop 119 will be set to "zero," flip-flop 120 will be set to "one" and flip-flop 121 will be set to "zero." Thus, the binary 0101 represents decimal 5. Because the display drum was last set to 3, the pattern from the binary commutator will read 0011. This means that comparator 118*a* will receive a ground or binary "one" from commutator 56. It will compare this with the binary "one" from flip-flop 118 and will connect a positive voltage to the AND circuit. Comparator 119*a* will receive a binary "one" from the commutator, but will receive a binary "zero" from flip-flop 119. Therefore, comparator 119*a* will connect a ground to the AND circuit. Similarly comparator 120*a* will receive a binary "zero" from the commutator and a binary "one" from flip-flop 120 and will connect a ground to the AND circuit. In this example comparator 121*a* does not change since both flip-flop and commutator remain at binary zero.

The AND circuit produces a positive output only as long as all inputs are positive. Since comparator 119*a* and comparator 120*a* connect a ground to the AND circuit, the output of the AND circuit will also become ground. This ground is connected through contact 127 which connects to conductor 57 and rivet 57*a* in FIGURE 5, and thence to a segment of the stationary decimal commutator 83. This connects a ground to one side of a coil 80. Since the other side is connected to a positive voltage, this particular coil is energized. The electric current flowing through this one coil attracts the permanent magnet attached to the display drum, causing it to rotate.

Rotation of the display drum changes the pattern of ground signals supplied by the binary commutator 56 via the four contacts 125. When the display drum is in a position where the ground signals on the four contacts 125 are identical to the binary 0101 set into the four flip-flops, the outputs of all four comparators will be positive, making the output of the AND circuit positive and connecting this positive voltage via the decimal commutator 83 to one of the coils 80. With positive voltage on both sides of the coil, no current flows through it and the motion of the display drum stops. When the binary commutator 56 reads 0101 to the four contacts 125 the visible numeral should be 5.

In place of electrical contacts and conducting commutators, it is possible to use transparent and opaque patterns sensed by photo cells which takes the place of sliding contacts. A pattern of magnetic material positioned near and sensed by coils could also replace the sliding contacts and commutators.

For manual input of information, the means 18 is depressed, and turning of the same also turns the display drum. Since the binary commutator is mounted on the display drum, it will turn with it. It is only necessary that the contacts from the binary section be connected to the correct binary inputs of the computer in order to read the binary number into the machine. When means 18 is released, the spring-loaded slider 100 returns it to the disengaged condition.

I wish it to be understood that I do not consider the invention limited to the precise details of structure shown and set forth in this specification, for obvious modifications will occur to those skilled in the art to which the invention pertains.

I claim:

1. A combination input-output display for use in inserting information into a computer and reading out computed information, comprising: a display drum having a principal axis, said display drum having a plurality of surfaces, there being a number of visual symbols upon one of said surfaces, said symbols being related in position and meaning to a code arrangement; a second code arrangement related in position to said symbols, and related in meaning to a computer code, said second code arrangement being on a second surface of a display drum; stationary means for sensing both of said codes; means supporting said display drum for axial rotation, said display drum having a magnet thereon responsive to a directionally oriented flux, and a coil assembly including a plurality of arcuately arranged coils disposed in operative proximity to said magnet; a stationary commutator located parallel to a surface of said display drum and arranged to correspond in number of segments and their position to the arcuately located coils, with one end of each coil electrically connected to one segment of the commutator; a wiper arm mounted on said display drum and contacting any one of said commutator segments and said wiper arm electrically connected to external control means.

2. A combination input-output display for use in inserting information into a computer and reading out computed information, comprising: a display drum having a principal axis, said display drum having a plurality of surfaces, there being a number of visual symbols upon one of said surfaces, said symbols being related in position and meaning to a code arrangement; a second code arrangement related in position to said symbols, and related in meaning to a computer code, said second code arrangement being on a second surface of a display drum; stationary means for sensing both of said codes; means supporting said display drum for axial rotation, said display drum having a magnet thereon responsive to a directionally oriented flux, a coil assembly including a plurality of arcuately arranged coils disposed in operative proximity to said magnet; a stationary commutator located parallel to a surface of said display drum and arranged to correspond in number of segments and their position to the arcuately located coils, with one end of each coil electrically connected to one segment of the commutator; a wiper arm mounted on said display drum and contacting any one of said commutator segments and said wiper arm electrically connected to external control means; and manually operable means for selectively contacting the surface of said drum to insert decimal information.

3. A combination input-output display for use in inserting information into a computer and reading out computed information, comprising: a display drum having a principal axis, said display drum having a plurality of surfaces, there being a number of visual symbols upon one of said surfaces, said symbols being related in position and meaning to a code arrangement; a second code arrangement related in position to said symbols, and related in meaning to a computer code, said second code arrangement being on a second surface of a display drum; stationary means for sensing both of said codes; means supporting said display drum for axial rotation, said display drum having a magnet thereon responsive to a directionally oriented flux, a coil assembly including a plurality of arcuately arranged coils disposed in operative proximity to said magnet; a stationary commutator located parallel to a surface of said display drum and arranged to correspond in number of segments and their position to the arcuately located coils, with one end of each coil electrically connected to one segment of the commutator; a wiper arm mounted on said display drum and contacting any one of said commutator segments and said wiper arm electrically connected to external control means; and manually operable means for selectively contacting the surface of said drum to insert information corresponding to said visual symbols.

4. In a combination input-output display and a computer having a computer information input employing a computer code other than decimal, the improvement comprising: a display drum arranged for rotation about a principal axis, said drum including visually observable symbols and a coaxially arranged computer core commutator thereon, sliding contacts connecting said computer code commutator to said computer, directionally positionable magnet means mounted on said drum, a coil assembly having means for inducing a directionally oriented flux surrounding said magnet, a stationary decimal commutator, a wiping contact on said drum selectively contacting said decimal commutator, said commutator being connected to said coil assembly; said computer including a plurality of flip-flop stations and a corresponding plurality of comparator circuits connected thereto; said comparator circuits being connected between said computer code commutator and said decimal commutator, and serving to compare the condition of their respective flip-flop stations with the condition of the sliding contacts contacting said computer code commutator.

References Cited by the Examiner

UNITED STATES PATENTS

| | | | |
|---|---|---|---|
| 2,676,289 | 4/1954 | Wulfsberg | 340—347 |
| 2,823,344 | 2/1958 | Ragland | 340—347 |
| 2,827,626 | 3/1958 | De Motte | 340—347 |
| 2,943,313 | 6/1960 | Gordon et al. | 340—378 |

MALCOLM A. MORRISON, *Primary Examiner.*

J. F. MILLER, *Assistant Examiner.*